UNITED STATES PATENT OFFICE.

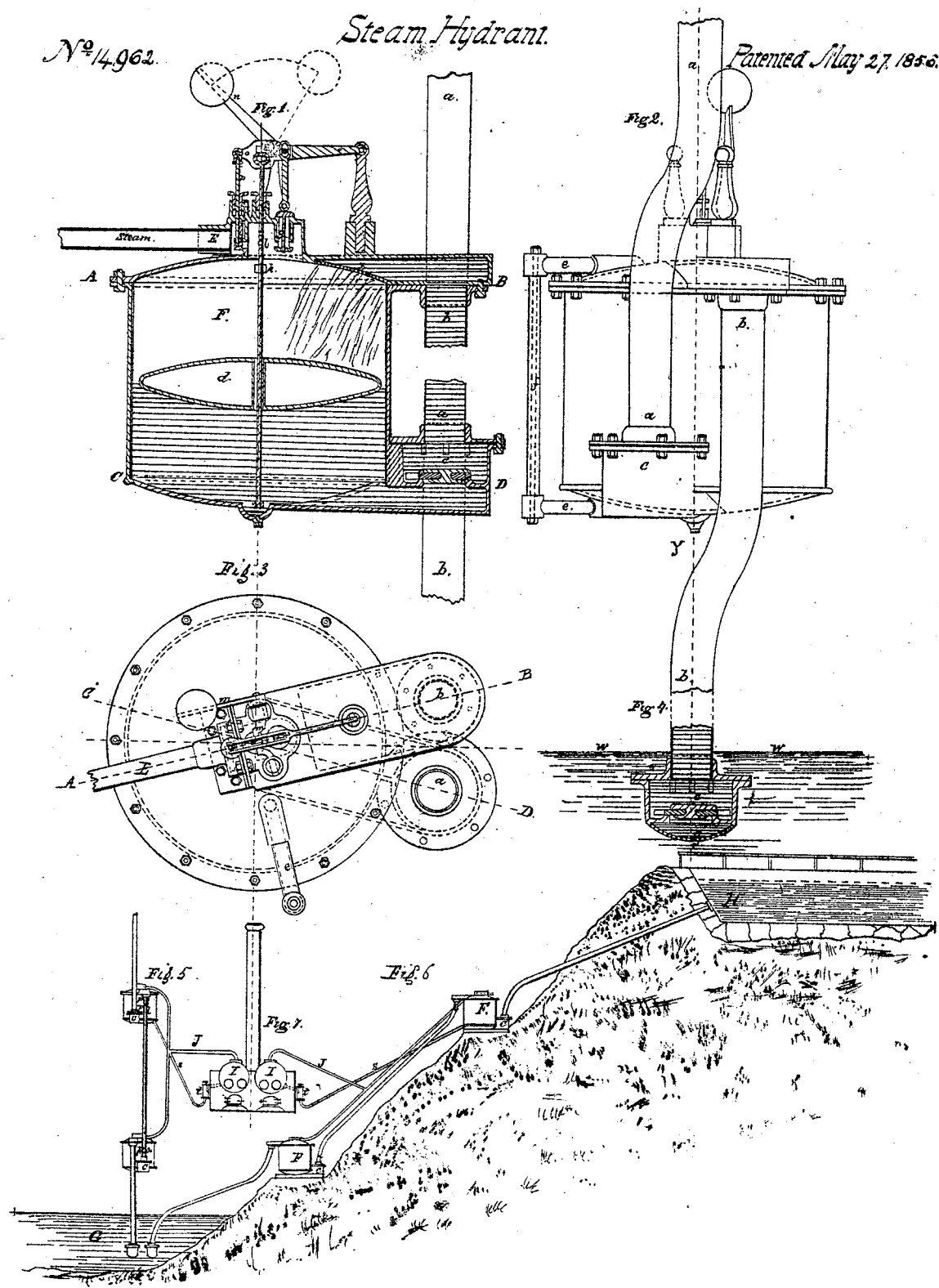

CHARLES K. LANDIS, OF PHILADELPHIA, PENNSYLVANIA.

IMPROVED ARRANGEMENT OF MEANS FOR OPERATING THE VALVES OF STEAM-HYDRANTS.

Specification forming part of Letters Patent No. 14,962, dated May 27, 1856.

*To all whom it may concern:*

Be it known that I, CHARLES K. LANDIS, of the city and county of Philadelphia, and State of Pennsylvania, have invented a new and useful Improvement in Hydrants, of which the following is a full, clear, and exact description, reference being had to the accompanying drawings, which form part of this specification, and in which—

Figure 1 is a section through A B and C D of Fig. 3. Fig. 2 represents a front elevation, and Fig. 3 a plan view, of the hydrant. Fig. 4 shows a valve-box. Figs. 5 and 6 are combinations of hydrants as they may be applied under different local circumstances.

My invention is based upon the fact that when in a vessel communicating with water the vacuum is obtained the outside pressure of the atmosphere will force the water to occupy the vacuum-space until the column of water balances the pressure of the atmosphere. The vacuum is obtained by introducing a jet of steam through the steam-pipe E into the cylinder or reservoir F, (Fig. 1,) driving the air contained therein out through the valve $c$ and pipe $a\ a$. By discontinuing then the jet of steam by closing the slide-valve $i$ the steam in the reservoir F will be condensed and the vacuum thus formed. The atmospheric pressure on the surface of the water $w\ w$ (see Fig. 4) will force the water up through the strainer $g$, valve $c$, and pipe $b\ b$, Fig. 2; lastly, through the strainer $h$ into the reservoir F, Fig. 1. The reservoir contains a float, $d$, in the form of a lens, and of such a diameter that the area of the circular surface of the water in the reservoir around the float will be about equal to the sectional area of the pipe $b$. The water is thus enabled to run off and raise the float toward the stud $k$, and lift the rod $l$, which is connected with the crank $m$, lever and ball $n$. When the ball and lever $n$ have passed their vertical position, the crank $m$ lifts the lever $o\ o$, with the rod $p$, and opens the slide-valve $i$. Thus a jet of steam is again introduced into the reservoir, which opens the top and closes the bottom of the double valve $q$. The pressure of the steam upon the surface of the water and on the float will force the water through the valve $c$ and pipe $a\ a$ up to the required level. When the float reaches the bottom of the reservoir, it bears upon the stud $r$ and lowers the rod $l$, with the crank $m$, lever and ball $n$, to their former positions. The lever $o\ o$ will then close the slide-valve $i$ and open the double valve $q$, allowing the surplus steam above the atmospheric pressure to escape. The remaining steam will now be condensed, the vacuum be formed, and another operation follows.

It will be observed that the lever $o\ o$ opens the valve $q$ for the escape of the surplus steam, but does not close it. It is closed and kept tight during the formation of the vacuum in the reservoir by the pressure of the atmosphere. The lever opens the valve on the upper side only, and the steam closes it on the under side, the operation being as follows: The valve $q$ is connected with the lever $o\ o$ by a link having an oblong hole in the upper end, so as to allow to the valve a free motion independent of the lever. When the reservoir is full of water, and when the float $d$ has raised the rod $l$, crank $m$, and lever $o\ o$, the valve $q$ is also raised, but not sufficiently high to close it on the under side; but as at the same time the slide-valve $i$ opens the steam is admitted into the reservoir and closes the valve $q$ completely. The pressure of the steam in the reservoir now forces the water through the valve $c$ and pipe $a\ a$, as above described. The reservoir F and the float $d$ are both lined or coated with a non-conductor of heat—the former inside, the latter outside—for the purpose of preventing the metallic sides from becoming heated by the steam.

The height of water in the reservoir F is indicated by a glass tube, $f$, communicating with the reservoir by the pipes $e\ e$.

Figs. 5 and 6 illustrate the mode of connecting two or more steam-hydrants, according to local circumstances, which operate as follows: When the water is raised into the first reservoir F, as before described, steam is applied to force it farther up through the pipe $a\ b$ into the second reservoir or hydrant F. Steam is then applied in the second reservoir and forces the water farther up to a third-reservoir, or to the limited height required. In the meantime a vacuum is formed in and water is raised into the first reservoir. While steam is applied in the first a vacuum is formed in the second, and the operations continue alternately. Thus water can be raised to any height, with the limited pressure of steam applied, by placing the reservoir F at heights corresponding to a given pressure of steam.

Fig. 7 are steam-boilers furnished with steam and water pipes leading to and from the hydrants. The steam-boilers are fed with water from the upper hydrant by the hydrostatic pressure of the column of water in the pipes $s\ s$, the steam-pressure in the hydrant being the same as in the boiler. This mode of feeding boilers obviates the necessity of pumps or tanks placed at great elevations.

Fig. 5 shows the mode of connecting the hydrants when the water is to be raised vertically from a given point. In this case the hydrants will be inclosed by a tower or stand-pipe. Fig. 6 represents the manner of raising water up the side of a hill.

I am aware that a vacuum has been formed by the condensation of steam for the purpose of raising water, and that steam has been employed to force water out of a vessel into the atmosphere; but

What I claim as my invention, and desire to secure by Letters Patent, is—

The combined mechanism of the float $d$, slide-valve $i$, and double valve $q$, constructed and arranged as herein described, and for the purpose specified.

In testimony whereof I have signed my name to this specification before two subscribing witnesses.

CHAS. K. LANDIS.

Witnesses:
  WILLIAMS OGLE.
  A. DeKALB FARR.